United States Patent [19]

Boultinghouse

[11] Patent Number: 4,666,549

[45] Date of Patent: May 19, 1987

[54] POLYMER WELDING PROCESS AND COMPOSITION

[75] Inventor: Harold D. Boultinghouse, Bartlesville, Okla.

[73] Assignee: Phillips Petroleum Company, Bartlesville, Okla.

[21] Appl. No.: 770,488

[22] Filed: Aug. 29, 1985

[51] Int. Cl.$^4$ ............................ C09J 3/00; B32B 31/12
[52] U.S. Cl. .................................. 156/308.6; 156/326; 106/311
[58] Field of Search .................. 156/328, 308.6, 309.3, 156/305, 326; 106/311; 252/364; 524/357, 365

[56] References Cited

U.S. PATENT DOCUMENTS

| | | | |
|---|---|---|---|
| 3,766,114 | 10/1973 | Walker et al. | 260/28.5 B |
| 3,928,110 | 12/1975 | Arconti et al. | 156/313 |
| 4,558,869 | 12/1985 | Grove et al. | 156/308.3 |

OTHER PUBLICATIONS

*The Condensed Chemical Dictionary;* ninth ed., 1977, p. 556, "4-Methoxy-4-Methyl-2-Pentanone".

Primary Examiner—Donald E. Czaja
Assistant Examiner—J. Davis
Attorney, Agent, or Firm—Mark A. Montgomery

[57] ABSTRACT

A polymer is bonded or welded together with a composition containing at least one hydroxyl-ether and/or keto-ether.

15 Claims, No Drawings

POLYMER WELDING PROCESS AND COMPOSITION

BACKGROUND OF THE INVENTION

This invention relates to welding polymers. More particularly, this invention relates to welding resinous block copolymers containing antiblocking agent.

Solvent welding of thermoplastic resinous polymers has been known for some time utilizing such solvents as methylene chloride, methyl ethyl ketone, perchloroethylene, and 1,1-dichloroethane. However, these solvents suffer from one or more disadvantages such as toxicity, expense and the promotion of stress cracking in the welded polymer.

These solvents impose an additional problem when used to bond resinous block copolymers containing an antiblock agent such as a microcrystalline wax as disclosed in U.S. Pat. No. 3,766,114, the disclosure of which is incorporated herein by reference. With this type of block copolymer that contains an antiblock agent the usual solvent materials employed for solvent welding cause serious problems because the solvent materials dissolve the wax as well as soften or dissolve the polymer. This dissolved wax tends to remain sticky or tacky for extended periods of time at the surface, thus causing difficulties in handling the solvent welded articles.

OBJECT OF THE INVENTION

It is an object of this invention to provide a composition and process to weld polymers; it is yet a further object of this invention to provide a permanently welded resinous block copolymer which has good blocking characteristics; and it is yet a further object of this invention to avoid the deleterious effects on weldability caused by antiblocking agents.

DESCRIPTION OF THE INVENTION

In accordance with this invention a polymer is welded with a composition containing at least one hydroxyl-ether and/or keto-ether.

In accordance with a specific aspect of this invention, a resinous block copolymer having an antiblock agent therein is welded with a welding composition containing at least one hydroxyl-ether and/or keto-ether.

In a specific welding process a surface softening amount of at least one hydroxyl-ether and/or keto-ether is applied to at least one surface of a conjugated diene/monovinyl substituted aromatic block copolymer for a sufficient length of time to soften the copolymer and then the softened copolymer surface is contacted with another surface under conditions sufficient to bond the two surfaces.

DETAILED DESCRIPTION OF THE INVENTION

It is envisioned that any polymer that is compatible with the hydroxyl-ether and/or keto-ether can be welded according to this invention. However, the preferred being resinous block copolymers.

The present invention is most useful when welding a resinous block copolymer containing a microcrystalline wax antiblock agent.

The resinous block copolymer can be any resinous block copolymer of a conjugated diene and a monovinyl-substituted aromatic compound.

Suitable conjugated dienes or mixtures thereof that can be employed includes those having 4–12 carbon atoms per molecule, those containing 4–8 carbon atoms being preferred. Exemplary of suitable compounds are 1,3-butadiene, isoprene, 2,3-dimethyl-1,3-butadiene, piperylene, 3-butyl-1,3-octadiene, 2-phenyl-1,3-butadiene, and the like, and mixtures thereof, 1,3-butadiene being particularly preferred.

The monovinyl-substituted aromatic compounds are those containing 8–18 carbon atoms per molecule. Examples of suitable compounds include styrene, 3-methylstyrene, 4-n-proplystyrene, 4-cyclohexylstyrene, 4-decylstyrene, 2-ethyl-4-benzylstyrene, 4-p-tolylstyrene, 4-(4-phenyl-n-butyl)styrene, 1-vinylnaphthalene, 2-vinylnaphthalene, and the like, styrene being preferred.

The polymers can be of either an A-B configuration, an A-B-A configuration, or a coupled radial (AB)-(BA)$_n$ configuration where n is 2 or more, preferably 2 or 3. The coupling agent is disregarded in the last formula since it is so small compared with the length of the polymer chains. This latter formula can also be expressed X(BA)$_n$ where X is the coupling agent and n is greater than 2. The A is the resinous monovinyl-substituted aromatic compound block which can optionally have incorporated therein a small amount of a comonomer. The B is a rubbery diene block which optionally can have some comonomer incorporated therein, the B blocks being insufficient to cause the total block copolymer to be rubbery.

By resinous is meant a normally solid material not having rubber properties. Generally such materials will have a Shore D hardness (ASTM D2240-75) of greater than about 62, preferably greater than about 69.

The preferred polymers are radial polymers, the preparation of which is broadly disclosed in Zelinski et al, U.S. Pat. No. 3,281,383 issued Oct. 25, 1966, the disclosure of which is hereby incorporated by reference, it being understood that the radial block copolymers of this invention are limited to those having resinous characteristics. Resinous block copolymers having branches of polymer which demonstrate a plurality of modes on a gel permeation chromatograph curve prior to coupling are disclosed in Kitchen et al., U.S. Pat. No. 3,639,517, issued Feb. 1, 1972, and Kitchen, U.S. Pat. No. 4,091,053, issued May 23, 1978, the disclosures of which are hereby incorporated by reference, are especially preferred.

Briefly the preferred resinous radial block polymers to which this invention applies can be prepared by producing a block of monovinyl-substituted aromatic compound in the presence of an organolithium initiator to give a block containing an active lithium atom on one end of the polymer chain. This living chain is then reacted with the conjugated diene monomer to give a block copolymer chain with an active lithium atom at one end thereof. This lithium-terminated copolymer is then reacted with a compound which has at least three reactive sites capable of reacting with the lithium-carbon bond and adding to the carbon possessing this bond in the polymer. The result is a polymer having relatively long branches which radiate from the nucleus formed by the polyfunctional compound reacted with the lithium-terminated polymer.

The anti-block agent which is present in the polymer can be any conventional antiblock agent used in the art including microcrystalline waxes, stearates such as sodium stearate, alkyl amines, stearamides, and the like. Most preferred are microcrystalline paraffin waxes having a melting point in the range of 180°-200° F. Such materials are sold by Bareco Division, Petrolite Corporation. The antiblock agent can be present in an amount within the range of about 0.1 to about 20 weight percent based on the weight of the polymer although generally lower concentrations are used particularly where it is desired to have a final product which is clear. Preferred concentrations are in the range of 0.1 to 0.5 weight percent based on the weight of block copolymer. In accordance with this preferred embodiment samples having a haze of less than about 4.5-6 percent preferably less than about 2.5-4 percent (ASTM D1003-61 using Gardner Hazemeter) can be produced, the haze being determined on 100 mil thick injection molded specimens.

The welding composition in addition to at least one keto-ether and/or hydroxyl-ether solvent can also contain a viscosity improving amount of a polymer. Welding compositions, among other things, have a tendency to run off the surface to be welded. The more viscous welding compositions escape some handling problems and allow efficient utilization of the solvent.

Any polymer is considered to be useful to increase the viscosity of the welding solvent so long as it is compatible with the polymer material to be welded. When a resinous block copolymer is to be welded, it is preferred that the viscosity improving polymer be the same resinous block copolymer, thus avoiding compatibility problems.

The preferred amount of polymer added to the welding solvent is in the range from about 0.5 up to about 10 weight percent in the solvent, preferably from about 1 to about 5 weight percent.

Optionally, various colorants can be added to the welding composition in order to maintain a color match with the parts that are being bonded in the solvent welding operation.

Any hydroxyl-ether and/or keto-ether and mixtures thereof are considered useful for this invention. More particularly hydroxyl-ethers and keto-ether of the formula:

$$R_2C(OR')CR_2CROHCR_3$$

and $$R_2C(OR')CR_2COCR_3$$

respectively, wherein R is hydrogen or an alkyl group having from 1-5 carbon atoms wherein each R can be the same or different and wherein R' is an alkyl group having from 1-5 carbon atoms. The most preferred formulas are:

$$(CH_3)_2C(OR')CH_2CHOHCH_3$$

and $$(CH_3)_2C(OR')CH_2COCH_3.$$

Examples of hydroxyl-ethers include 4-ethoxy-4-methyl-2-pentanol; 4-propoxy-4-methyl-2-pentanol; and 2-methoxy-4-hexanol, 4-methoxy-4-methyl-2-pentanol being preferred.

The keto-ethers are preferred. Examples of keto-ethers include 4-ethoxy-4-methyl-2-pentanone; 4-propoxy-4-methyl-2-pentanone; and 2-methoxy-4-hexanone, 4-methoxy-4-methyl-2-pentanone being the most preferred.

The compound 4-methoxy-4-methyl-2-pentanone can be made by the reaction of anhydrous methanol with 2-methyl-2-pentene-4-one (commonly known as mesityl oxide) in the presence of a strongly basic ion exchange resin (Belgium Patent No. 631,124). This compound was available from Shell Oil Company as PENT-O-XONE ® solvent.

The polymer part which is to be solvent welded can be treated with the solvent welding composition according to this invention in conventional ways such as by dipping, application through a porous applicator roller, brushing, or by contact with a syringe type applicator for those applications needing a very thin or narrow solvent welded joint.

The solvent welding composition can be applied at any compatible temperature so long as the polymer does not melt or the solvent dry too fast. The preferred temperature is that ranging from ambient room temperature up to a slightly elevated temperature.

The polymer surface can be treated with the solvent welding composition for any length of time sufficient to soften the polymer joint, preferably from at least about 30 seconds up to about 90 seconds.

After application of the solvent welding composition the two parts are jointed by being pressed together under pressure adequate to maintain contact of the surfaces but not so excessive as to cause significant flow of the softened polymer at the interface of the joint.

EXAMPLE

Two possible welding solvents were tested on K-RO3 (Phillips Petroleum Co.), a resinous butadiene/styrene block copolymer containing microcrystalline wax antiblock agent. PENT-O-XONE ® (Shell Chemical Co. 4-methoxy-4-methyl-2-pentanone) did not dissolve the wax antiblock agent, but did dissolve the copolymer. TETRALIN (Tetrahydro-napthalene) did dissolve the wax slightly.

PENT-O-XONE ® solves the problem present when standard solvents are used on this copolymer; it does not dissolve the wax, therefore, the wax does not interfere with the welding of the copolymer.

TETRALIN does not work as well as PENT-O-XONE ® and is very toxic.

As shown by the above example, the instant invention is useful for welding polymers, particularly useful in welding resinous butadiene/styrene block copolymers containing a microcrystalline wax antiblock agent. With this type of block copolymer the usual solvent materials employed for solvent welding cause serious problems because they also dissolve the wax as well as softening the polymer. This dissolved wax tends to remain sticky or tacky for extended periods of time at the surface, thus causing difficulty in handling the solvent welded articles. The composition employed, according to the instant invention, appears to work very well because it does not dissolve the wax antiblock agent and thus avoids the tacky or sticky situation at the solvent welded joint.

That which is claimed is:

1. A process of welding polymers which comprises:
   (a) applying an effective amount of a welding composition to at least one surface portion of a first segment of a polymer, (b) contacting therewith a surface portion of a second segment of a polymer in surface-to-surface relationship, (c) applying an effective pressure to said segments to maintain said surface-to-surface relationship for a time suitable for bonding, thereby welding together said first and second polymer segments;

wherein at least one of said polymer segments comprises resinous conjugated diene/monovinyl-substituted aromatic block copolymer containing microcrystalline wax antiblock agent; and wherein said welding composition comprises at least one solvent selected from the group consisting of hydroxyl-ethers and keto-ethers of the formula:

$$R_2C(OR')CR_2CROHCR_3$$

and $$R_2C(OR')CR_2COCR_3$$

respectively, wherein R is hydrogen or an alkyl group having 1 to 5 carbon atoms, each R can be the same or different, and wherein R' is an alkyl group having 1 to 5 carbon atoms.

2. A process of welding polymers according to claim 1 wherein the conjugated diene and the monovinyl-substituted aromatic of said resinous conjugated diene/monovinyl-substituted aromatic block copolymer have 4 to 8 carbon atoms per molecule and 8 to 18 carbon atoms per molecule respectively.

3. A process of welding polymers according to claim 2 wherein said resinous conjugated diene/monovinyl substituted aromatic block copolymer is resinous butadiene/styrene block copolymer.

4. A process of welding polymers according to claim 1 wherein said welding composition contains a viscosity increasing amount of a resinous conjugated diene/monovinyl-substituted aromatic block copolymer.

5. A process of welding polymers according to claim 4 wherein said solvent is 4-methoxy-4-methyl-2-pentanone and said resinous conjugated diene/monovinyl-substituted aromatic block copolymer in said welding composition is resinous butadiene/styrene block copolymer.

6. A process of welding polymers according to claim 5 wherein the amount of said resinous butadiene/styrene block copolymer in said welding composition is in the range of about 0.5 to about 10 weight percent.

7. A process of welding polymers according to claim 6 wherein said resinous butadiene/styrene block copolymer in said welding composition is in the range of about 1 to about 5 weight percent.

8. A process of welding polymers according to claim 1 wherein said polymer segments and said welding composition contain a matching pigment.

9. A process of welding polymers according to claim 1 wherein said solvent is 4-methoxy-4-methyl-2-pentanone.

10. A process of welding polymers according to claim 9 wherein said at least one surface portion of a first segment of a polymer is treated with said 4-methoxy-4-methyl-2-pentanone for about 30 seconds up to about 90 seconds before said contacting of said step (b).

11. A process of welding polymers according to claim 10 wherein after said step (c) said first and second polymer segments are dried to form a solid polymer bond.

12. A process of welding polymers according to claim 11 wherein said first and second segments are contacted under pressure sufficient to mate said surfaces without causing softened polymer to flow from the interface of the joint.

13. A process of welding polymers according to claim 1 wherein said hydroxyl-ethers and keto-ethers are of the formula:

$$(CH_3)_2C(OR')CH_2CHOHCH_3$$

and $$(CH_3)_2C(OR')CH_2COCH_3$$

respectively, wherein R' is an alkyl group having 1 to 5 carbon atoms.

14. A process of welding polymers according to claim 1 wherein said hydroxyl-ethers and keto-ethers are selected from the group consisting of 4-ethoxy-4-methyl-2-pentanol, 4-propoxy-4-methyl-2-pentanol, 2-methoxy-4-hexanol, 4-methoxy-4-methyl-2-pentanol, 4-ethoxy-4-methyl-2-pentanone, 4-propoxy-4-methyl-2-pentanone, 2-methoxy-4-hexanone, and 4-methoxy-4-methyl-2-pentanone.

15. A process of welding polymers comprising:
(a) applying an effective amount of a welding composition to at least one surface portion of a first segment of a polymer,
(b) contacting therewith a surface portion of a second segment of a polymer in surface-to-surface relationship,
(c) applying an effective pressure to said segments to maintain said surface-to-surface relationship for a time suitable for bonding,
thereby welding together said first and second polymer segments;
wherein at least one of said polymer segments comprises resinous conjugated diene/monovinyl-substituted aromatic block copolymer containing microcrystalline wax antiblock agent; and
wherein said welding composition comprises 4-methoxy-4-methyl-2-pentanol and an amount of resinous conjugated diene/monovinyl substituted aromatic block copolymer sufficient to raise the viscosity of the welding composition and lower after welding drying time.

* * * * *